US007174229B1

(12) United States Patent
Chen et al.

(10) Patent No.: US 7,174,229 B1
(45) Date of Patent: Feb. 6, 2007

(54) METHOD AND APPARATUS FOR PROCESSING INTERAURAL TIME DELAY IN 3D DIGITAL AUDIO

(75) Inventors: Jiashu Chen, Holmdel, NJ (US); Christopher Anton Wendt, Howell, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/190,208

(22) Filed: Nov. 13, 1998

Related U.S. Application Data

(63) Continuation of application No. 09/191,179, filed on Nov. 13, 1998, now abandoned.

(51) Int. Cl.
*G06F 17/00* (2006.01)

(52) U.S. Cl. ........................................................ 700/94

(58) Field of Classification Search .................... 381/1, 381/17, 310, 74, 309, 12, 19, 300, 302–303, 381/307, 18, 61, 63; 700/94; 327/149, 153, 327/158, 161; 704/216, 218
See application file for complete search history.

(56) References Cited

U.S. PATENT DOCUMENTS

| | | | | |
|---|---|---|---|---|
| 4,817,149 | A * | 3/1989 | Myers | 381/1 |
| 5,105,462 | A * | 4/1992 | Lowe et al. | 381/17 |
| 5,337,363 | A * | 8/1994 | Platt | 381/17 |
| 5,381,482 | A * | 1/1995 | Matsumoto et al. | 381/18 |
| 5,671,287 | A * | 9/1997 | Gerzon | 381/17 |
| 5,809,149 | A * | 9/1998 | Cashion et al. | 381/17 |
| 5,974,154 | A * | 10/1999 | Nagata et al. | 381/63 |
| 5,995,631 | A * | 11/1999 | Kamada et al. | 381/1 |
| 6,026,169 | A * | 2/2000 | Fujimori | 381/61 |

* cited by examiner

*Primary Examiner*—Vivian Chin
*Assistant Examiner*—Lun-See Lao

(57) ABSTRACT

A high quality digital 3D sound rendering is implemented using high resolution interaural time delays formed from two delay lines: a first delay line providing a rough estimate of the desired interaural time delay for a particular audio sample, and a second delay line in series with the first delay line providing a more finely resolved fractional delay. In the disclosed embodiment, the first delay module, i.e., the integer delay module, is formed from a first-in, first-out (FIFO) buffer with appropriate selection control of a desired sample as it passes through the FIFO buffer with each clock cycle based on the sampling rate. The second delay module (i.e., the fractional delay module) is formed from a plurality of polyphase (FIR) filters. The number of polyphase filters is determined based on the desired resolution of the interaural time delay.

35 Claims, 5 Drawing Sheets

METHOD AND APPARATUS FOR PROCESSING INTERAURAL TIME DELAY IN 3D DIGITAL AUDIO

This application claims is a continuation of U.S. patent application Ser. No. 09/191,179 entitled "Method and Apparatus for Regular Rising Measured HTRF for Smooth 3D Digital Audio" filed Nov. 13, 1998 now abandoned, the specification of which is explicitly incorporated herein by reference.

BACKGROUND OF THE INVENTION

1. Field of the Invention

This invention relates generally to three dimensional (3D) sound. More particularly, it relates to a digital implementation of interaural time delays used in 3D digital sound applications.

2. Background of Related Art

Three-dimensional (3D) sound has become integral part of many personal computer (PC) and consumer electronics devices. It allows a user to experience realistic sound from any direction using only headphones or speakers.

The rendering of 3D sound involves simulation of a number of psychoacoustic phenomena occurring when sound is transmitted through air to each ear. Three of the most important phenomena are interaural time difference (ITD), interaural intensity difference (IID), and the head related transfer function (HRTF). The ITD is the difference in time that it takes for a sound wave to reach both ears. The IID is the sound level difference between each ear. The HRTF is the transfer function containing any filtering information about the transmission of sound to a particular ear. This impulse response contains information about the transmission of sound from a particular angular direction, including any reflections from the shoulder or head and any reflections occurring within the pinna of the ear.

ITD is an important and dominant parameter used in 3D sound rendering. The interaural time difference is responsible for introducing binaural disparities in 3D audio or acoustical displays. In particular, when a sound object moves in a horizontal plane, the interaural time delay is constantly changing depending on the relative location of the sound source and listener. Applying an accurate ITD to a sound can be used to create aural images of sound moving in any desired direction with respect to the listener.

Conventional 3D sound systems embed the interaural time difference in empirically determined HRTFs, typically determined with a mannequin head implanted with microphones in its ears. These delays typically have a relatively large resolution, e.g., 100 microseconds.

However, there are at least two basic problems with the implementation of the ITD in a digital environment. In a discrete time environment, time resolution is limited by sampling rate. The traditional use of integer sample delay has limitations. First, the ITD must be rounded to an integer delay, this gives less precision to the rendered ITD delay. Second, a 3D sound rendering which involves motion between multiple angles will incorporate different ITDs. In this situation there will be a discontinuity produced when the renderer switches between each ITD, thus, causing a 'click'. There is thus a need for a method and apparatus for providing a smoothed perceptually 'click-free' 3D sound rendering of the ITD.

SUMMARY OF THE INVENTION

In accordance with the principles of the present invention, a digital delay line for use in a 3D audio sound system comprises a first delay module providing a choice of any delay within the sampling rate resolution. A second delay module is in series with the first delay module. The second delay module provides a choice of any of a plurality of additional fractional delays.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

In accordance with the principles of the present invention, the ITD is either extracted from measured and empirically determined HRTFs or synthesized using an appropriate head model, smoothed, and implemented in a look-up table. Implementation of the ITD is provided by a delay line including both an integer portion providing rough estimate delays and a fractional portion providing a very accurate delay and perceptually eliminating discontinuities in the listening field.

Figure 1:
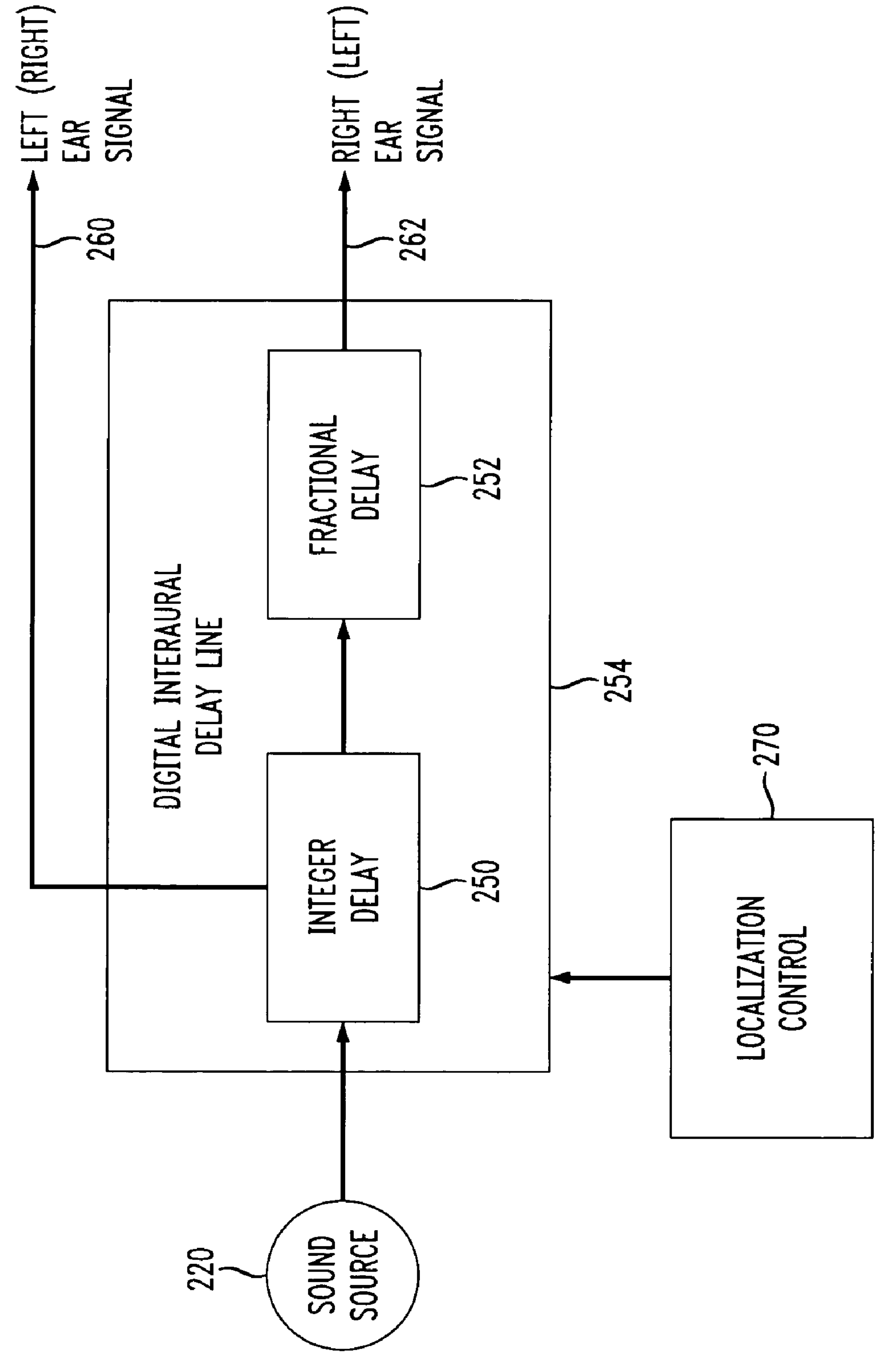
FIG. 1 is a block diagram showing the digital 3D sound system including a digital interaural delay line, in accordance with the principles of the present invention.

FIG. 1 is a block diagram showing the basic components of the disclosed embodiment of a digital 3D sound system including a digital interaural time delay line, in accordance with the principles of the present invention.

In particular, a sound source 220 is input into a digital interaural time delay line 254. the interaural delay line 254 includes an integer delay module 250 providing a rough estimate of the desired interaural time delay, and a fractional delay module 252 providing a highly refined additional time delay. In the disclosed embodiment, both the particular settings of both the integer delay module 250 and the fractional delay module 252 are chosen from among a plurality of predetermined delays, greatly reducing or eliminating the otherwise intensive calculations necessary to interpolate a particular interaural time delay.

The particular delay associated with the left (or right) ear signal 260 and the right (or left) ear signal 262 providing the desired localization of the sound image is provided by a localization control module 270.

Figure 2:
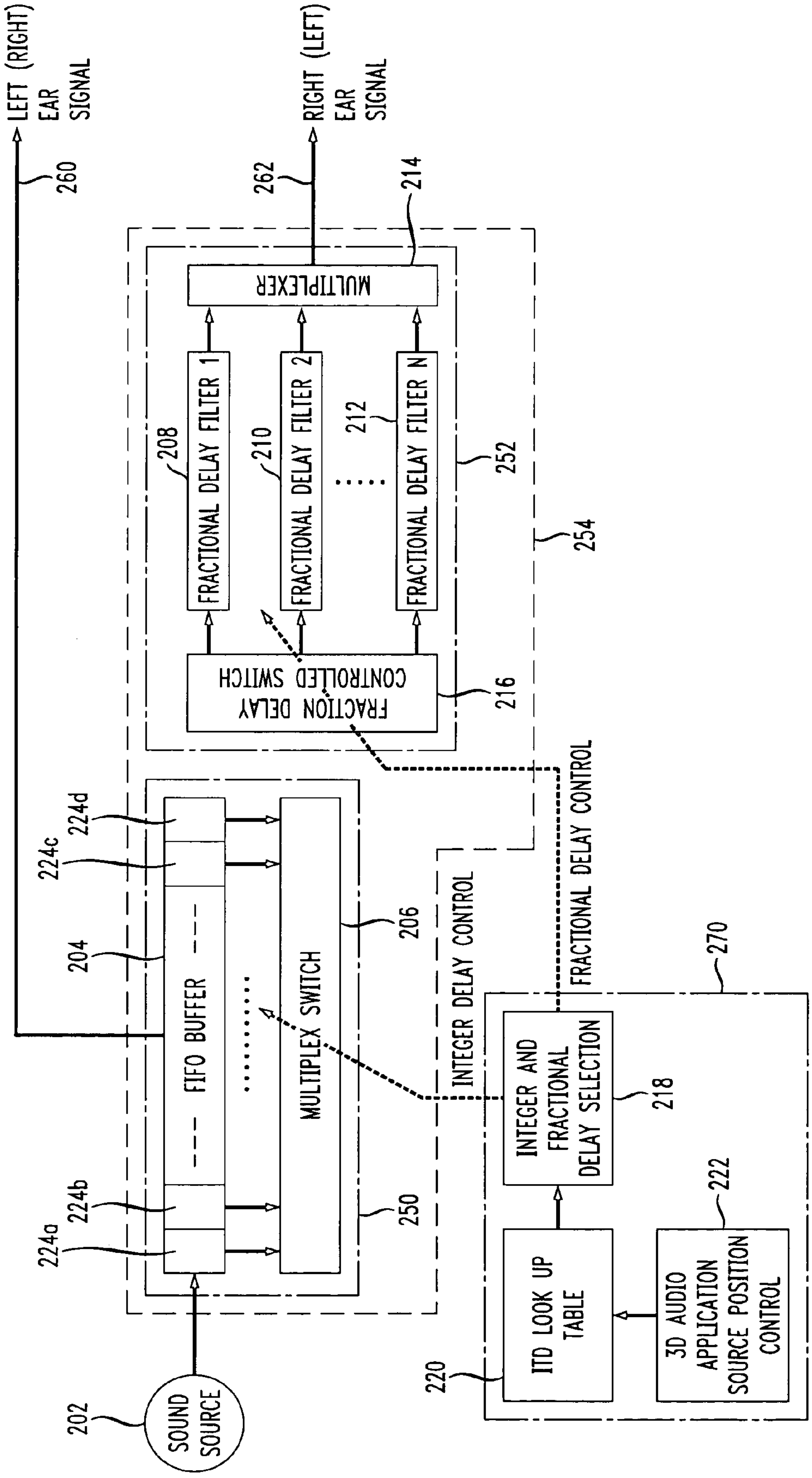
FIG. 2 is a more detailed diagram showing the digital 3D sound system for creating 3D sound in a digital environment, in accordance with the principles of the present invention.

FIG. 2 is a more detailed diagram showing the digital 3D sound system shown in FIG. 1.

In particular, the integer delay module 250 of the disclosed embodiment is comprised of a first-in, first-out (FIFO) buffer 204. The FIFO buffer 204 may be of any suitable width, e.g., 16 bits, corresponding to the length of the digital audio samples. Moreover, the length of the FIFO buffer 204 will be based on the largest delay necessary to implement the desired 3D sound imaging. The particular delay is related to the selected number of clock cycles after the particular digital audio sample was input to the FIFO buffer 204. This selection of an integer delay time is represented in FIG. 2 with a multiplex switch 206. The use of any of the particular digital audio samples 224*a*–224*d* are fed serially into the FIFO buffer 204, with the arrows from each of the samples 224*a*–224*d* representing tap numbers.

The clock cycle of the FIFO buffer 204 relates to one over the sample rate. Thus, with an exemplary sample rate of 22 kHz, the 'integer' portion, or resolution of the integer delay module 250 is $1/22{,}050$ or approximately 45 microseconds (uS).

The second portion of the digital interaural delay line 254 provides a much more refined 'fractional' delay with a fractional delay module 252. This fractional delay is provided by the selection of any one of a plurality of fractional delay filters 208–212.

The fractional delay module 252 effectively produces an adjustable digital delay with a finer resolution than the integer delay module 250. Each of the fractional delay filters 208–212 is a so-called all-pass filter that has a variable phase shift, corresponding to the required fractional delay. The number of phases (i.e., fractional delay filters 208–212) is determined empirically by behavioral testing of human listening.

In the disclosed embodiment, 64 fractional delay filters are utilized, each providing an incrementally greater delay, in finely resolved increments suitable to the application. For instance, at the exemplary sample rate of 22 kHz, the resolution between the fractional delay filters 208–212 is (45 uS)/64, or about 0.7 uS resolution. This particular fine resolution (and the rough estimate resolution provided by the integer delay module 250) can be adjusted based on the needs of the particular application.

Each fractional delay filter 208–212 is a finite impulse response (FIR) filter, i.e., a polyphase filter, effecting the desired delay. Each of the fractional delay filters 208–212, and/or the fractional delay controlled switch 216 and/or the multiplexer 214 can be implemented in any suitable processor, e.g., in a digital signal processor (DSP), microprocessor, or microcontroller. Alternatively, the digital filters can be implemented in hardware in accordance with the principles of the present invention.

In the exemplary embodiment utilizing a sampling rate of 22 kHz and 64 fractional delay filters, the first fractional delay filter 208 provides 0.7 uS delay to a digital audio sample, the second fractional delay filter 210 provides approximately 1.4 uS delay, etc., the last fractional delay filter 212 which provides approximately 44.3 uS delay.

Selection of the appropriate fractional delay filter 208–212 is implemented by a multiplexer 214 in the fractional delay module 252. In the shown embodiment, the fractional delay filters 208–212 are each implemented in a processor, e.g., in a digital signal processor, and selection of an appropriate one of the fractional delay filters 208–212 is desirable at the front end to avoid wasted computational power by running fractional delay filters 208–212 which are not being used for that particular audio sample.

The interaural time delay is controlled by the localization control module 270, which includes a 3D audio application source position controller 222, an interaural time delay (ITD) look-up table 220, and an integral and fractional delay selector 218. In the disclosed embodiment, the localization control module 270 is implemented in a suitable processor, e.g., in a microprocessor, microcontroller, or digital signal processor (DSP). Of course, the localization control module 270 may alternatively be partially or wholly implemented in hardware, e.g., using programmable array logic.

The 3D audio application source position control 222 selects a desired 'phantom' position of the sound sample currently being input to the digital interaural delay line 254. The desired location may have a desired x, y and z coordinate with respect to a reference point, e.g., the center of the listener's head. Based on the desired location, an associated ITD is determined in the ITD look-up table 220. The integer and fractional delay selector determines the largest integer value which can be achieved within the resolution of the integer delay module 250 without exceeding the desired ITD, and appropriately controls the integer delay module 250 to provide that desired delay to the audio sample. Similarly, the remainder or fractional portion of the desired ITD which is not provided by the integer delay module 250 is provided by an appropriate selection of a desired one of the available fractional delay filters 208–212 in the fractional delay module 252.

Figure 3:
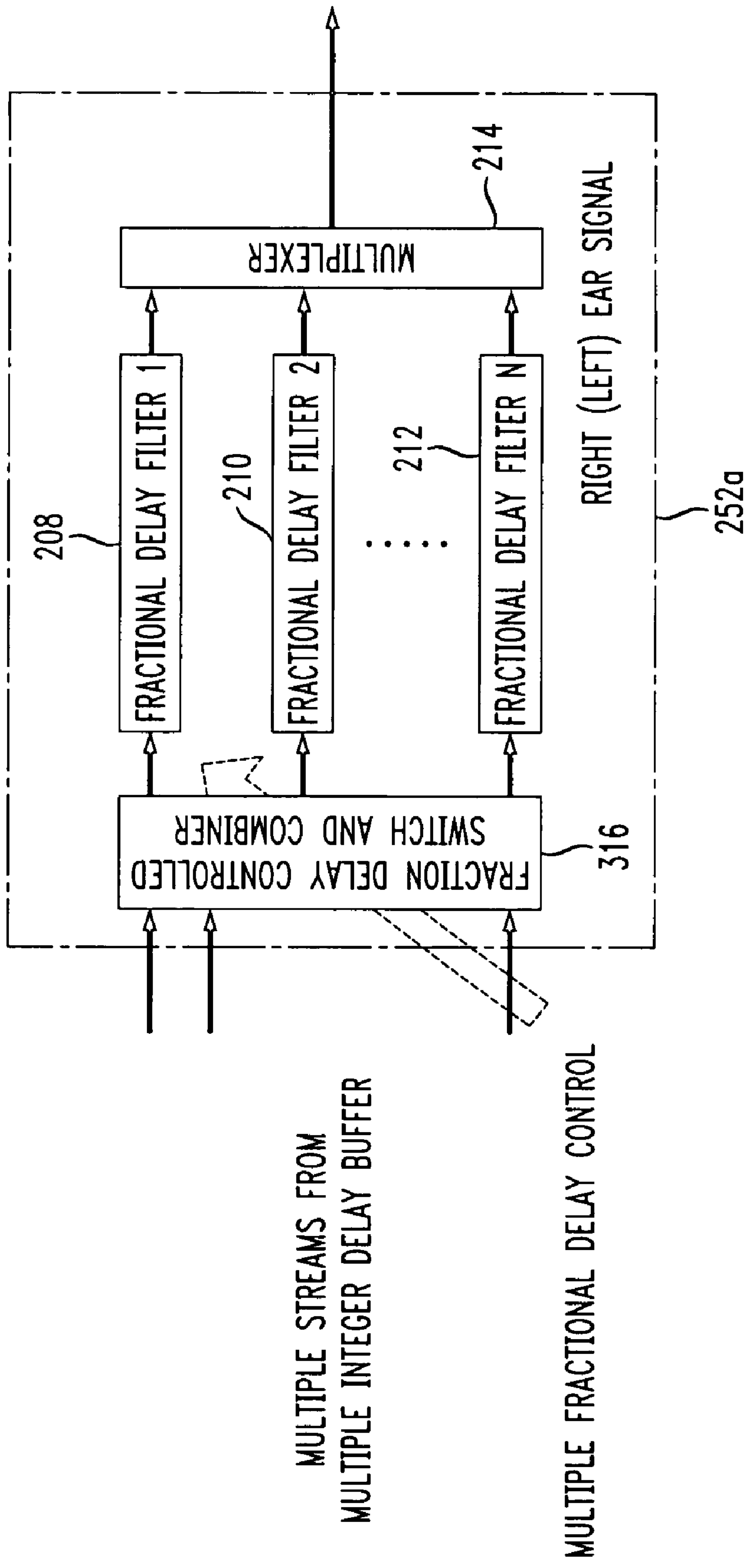
FIG. 3 is a diagram showing the implementation of multiple digital audio streams using a common bank of fractional delay filters, in accordance with the principles of the present invention.

FIG. 3 is a diagram showing the implementation of multiple digital audio streams using a common bank of fractional delay filters, in accordance with the principles of the present invention. Thus, the plurality of fractional delay filters 208–212 can be utilized by a plurality of audio sources for the same listener, avoiding the need to duplicate the fractional delay module 252 for each audio source.

Figure 4:
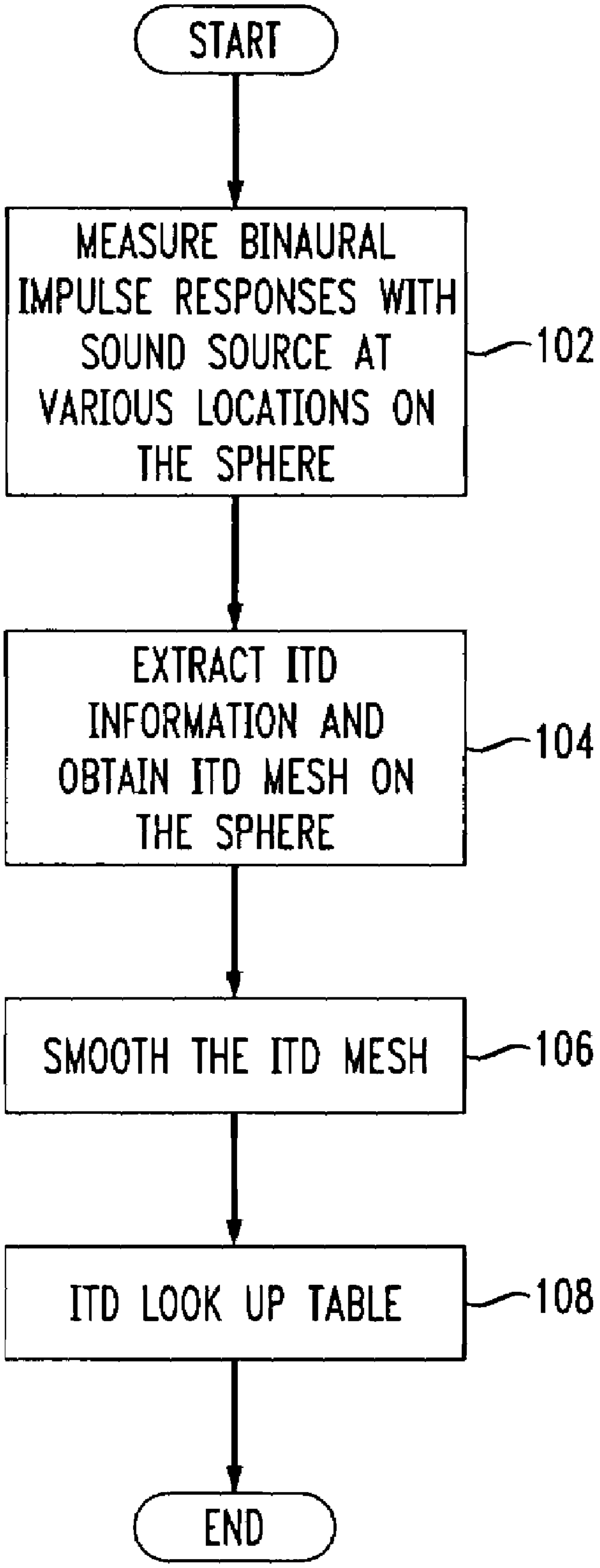
FIG. 4 shows a process for creating an improved ITD look-up table suitable for use in an ITD look up table for use with 3D sound applications as shown in FIGS. 1 and 2, in accordance with the principles of the present invention.
Figure 5:
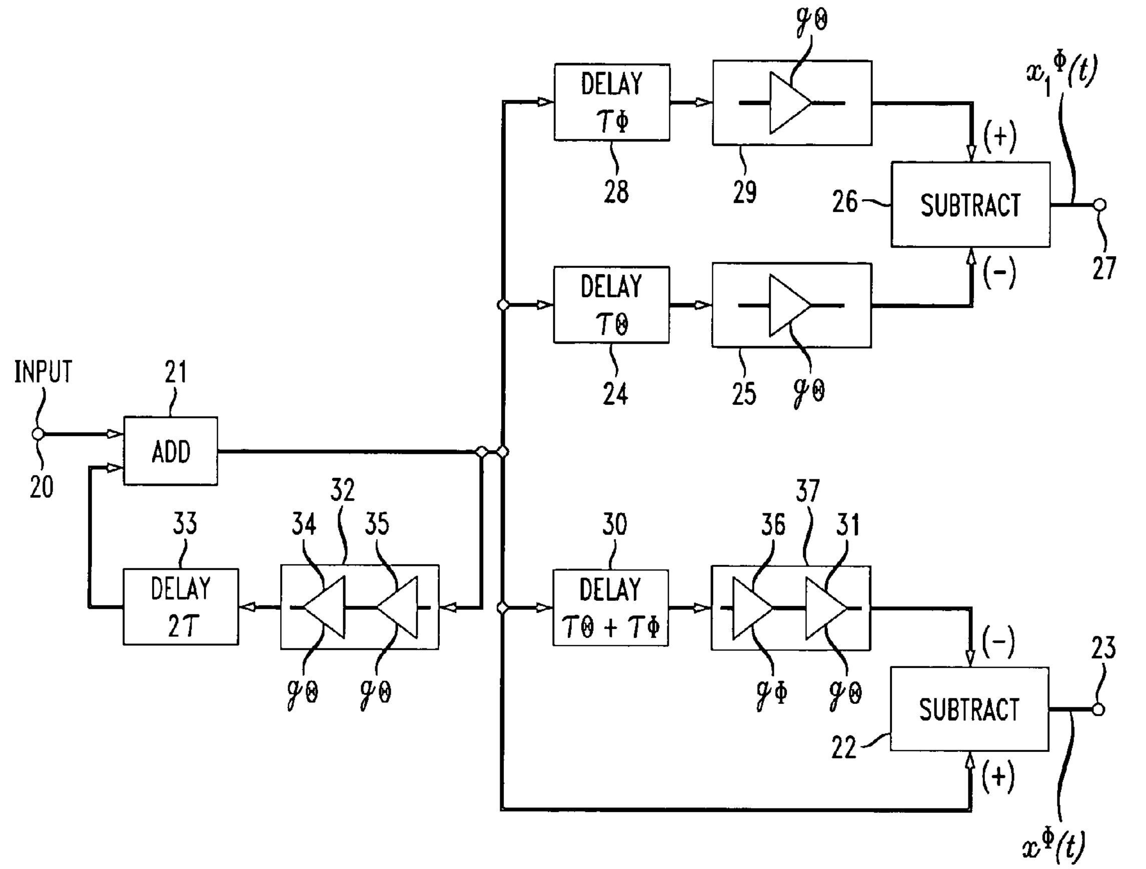
FIG. 5 PRIOR ART
FIG. 5 shows a conventional 3D sound system for creating the image of sound from a phantom locality with respect to the listener.
Figure 6:
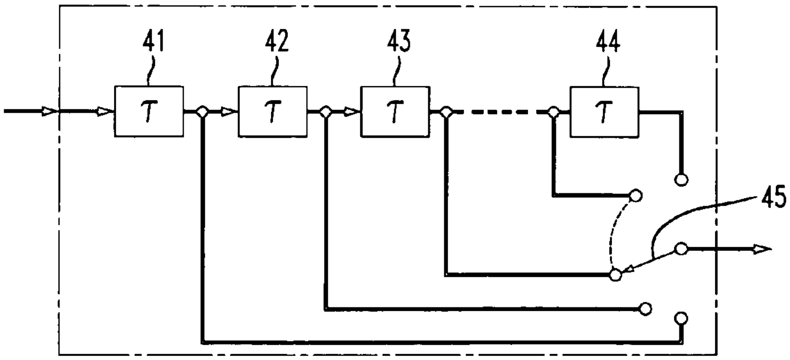
FIG. 6 PRIOR ART
FIG. 6 shows a conventional delay line with multiple tap points implemented by Atal-Schroeder.

FIG. 4 shows a process for creating the ITD look-up table 220 shown in FIG. 2.

In particular, in step 102, binaural impulse responses are either empirically measured with a sound source at various locations around the listening environment, e.g., at incremental points along a sphere about the sound source or synthesized using an appropriate head model.

In step 104, the ITD information can be extracted from the empirically measured information obtained in step 102, and a 'mesh' of ITD values for each appropriate point on the sphere is determined. In particular, the ITD samples may be extracted from measured left-right ear head-related transfer functions (HRTFs). These samples can be viewed as discrete samples of an underline continuous ITD function of azimuth and elevation coordinates.

In step 106, to avoid undesirable effects for the listener, the ITD mesh determined in step 104 is smoothed using any appropriate smoothing algorithm. For instance, the ITD samples may be regularized using a "generalized spline model" or appropriately filtered and interpolated by a two-dimensional filter to gain smoothness and continuity. While this smoothing may be calculation intensive, it is performed once, off-line, and not performed in real-time as digital audio samples are received.

An ITD mesh can also be synthesized from a head model, i.e. spherical head model, or any other appropriate method of modeling the ITD.

In step 108, either the smoothed ITD mesh or synthesized ITD samples are input into the ITD look-up table 220. The ITD mesh may utilize any appropriate coordinate system, e.g., spherical coordinates or a standard x, y and z coordinate system.

In the disclosed embodiment it was determined that the finest time resolution of the overall delay, i.e., the combination of the delay provided by the integer delay module 250 and the fractional delay module 252, is preferably less than 1 microsecond (μS) such that any discontinuity caused in the sound stream is under the perceptual threshold of a typical human. In the case of a high sampling rate, faster time resolution may be preferred. For example, with a 22.05 kHz sampling rate of an audio stream, a 64-phase polyphase filterbank was used to obtain sub-microsecond resolution in the time delay.

While the fractional delay filters 208–212 in the disclosed embodiment are each a FIR (polyphase) filter, the principles of the present invention are equally applicable to the use of other filters or digital delays which provide the required delay in a digital audio sample.

The digital interaural delay line 254 in accordance with the principles of the present invention can be implemented in any suitable processor or computer system. For instance, the digital interaural delay line 254 can be implemented at a host level in a personal computer (PC) based platform using regular instruction sets or MMX™ technology, or can be implemented in a digital signal processor (DSP).

To further improve upon efficiency in accordance with the principles of the present invention, the delay may be fixed for one ear, and varied for the sound intended for the other ear, according to the desired movement of the source sound. This alternative method may save as many as half of the instruction cycles required to otherwise process a variably delayed sound to both ears.

The appropriately delayed left and right ear signals can be forwarded to a next stage for further processing, or sent directly to headphones or loudspeakers for presentation to the listener, as a simple binaural signal processing method.

Since ITDs are extracted or synthesized, processed, and implemented separately in a roughly resolved delay module (i.e., the integer delay module 250), and in a finely tuned delay module (i.e., the fractional delay module 252), the 3D audio effects can be easily controlled and adjusted to suit other special requirements, e.g., to be optimized for different head sizes. The super resolution sub-sample filtering polyphase filter based delay lines in accordance with the principles of the present invention introduce necessary delay without introducing discontinuity or 'clicks' in the presentation to the listener.

The principles of the present invention are applicable for use in any 3D audio system that uses an interaural time delay as a localization queue for perceived direction of the sound by the listener. For instance, the present invention relates to 3D sound positioning in gaming, virtualizing multiple loudspeaker array systems having two physical speakers in AC3/Dolby™ Digital systems, advanced computer user interfaces, virtual acoustic reality software for architectural walk-throughs, auralization hardware/software, 3D enhancement for general stereo and wireless headphone sets, etc.

While the invention has been described with reference to the exemplary embodiments thereof, those skilled in the art will be able to make various modifications to the described embodiments of the invention without departing from the true spirit and scope of the invention.

What is claimed is:

1. Apparatus for generating a delayed output digital audio signal from an input digital audio signal, the apparatus comprising:

a first delay module adapted to apply a first amount of delay to the input digital audio signal to generate a partially delayed digital audio signal, wherein the first delay module is adapted to select the first amount of delay from a plurality of available first delay values separated from one another by increments at a first resolution level; and a second delay module adapted to apply a second amount of delay to the partially delayed digital audio signal to generate the delayed output digital audio signal, wherein the second delay module is adapted to select the second amount of delay from a plurality of available second delay values separated from one another by increments at a second resolution level different from the first resolution level.

2. The invention of claim 1, wherein the total range of the plurality of available second delay values at the second resolution level is substantially equal to each increment at the first resolution level.

3. The invention of claim 1, wherein the first delay module comprises:

a buffer adapted to receive and store a plurality of digital values corresponding to the input digital audio signal such that each position in the buffer corresponds to a different one of the plurality of available first delay values; and a switch having a plurality of input ports and an output port, wherein:

each input port is connected to receive a different digital value stored in the buffer; and the switch is adapted to present one of the received digital values at its output port based on a first delay control signal.

4. The invention of claim 3, wherein the buffer is a first-in, first-out (FIFO) buffer adapted to receive a new digital value in the input digital audio signal at each clock cycle of the FIFO buffer.

5. The invention of claim 1, wherein the second delay module comprises:

a plurality of digital filters, configured in parallel, each digital filter adapted to apply a different one of the plurality of available second delay values; and switch circuitry adapted to select, based on a second delay control signal, one of the digital filters to provide the second amount of delay.

6. The invention of claim 5, wherein the digital filters are all-pass filters having different phase shift values.

7. The invention of claim 5, wherein the switch circuitry comprises an input switch adapted to receive and forward the partially delayed digital audio signal to only the selected digital filter.

8. The invention of claim 7, wherein the switch circuitry further comprises an output multiplexer having a plurality of input ports and an output port, wherein:

each input port is connected to a different digital filter; and the output multiplexer is adapted to present the output from the selected digital filter at its output port.

9. The invention of claim 1, further comprising a control module adapted to generate first and second delay control signals used by the first and second delay modules to select the first and second amounts of delay.

10. The invention of claim 9, wherein:

the control module comprises a look-up table (LUT) storing data that maps 3D positions to interaural delays; and the control module is adapted to:

receive a specified 3D position value;

retrieve a corresponding interaural delay value from the LUT based on the specified 3D position value; and generate the first and second delay control signals on the retrieved interaural delay value.

11. The invention of claim 1, wherein:

the first delay module is a coarse delay module having a coarse resolution level; and the second delay module is a fine delay module having a fine resolution level that is finer than the coarse resolution level.

12. The invention of claim 11, wherein the first and second amounts of delay are applied to the input digital audio signal to create a relative delay between the delayed output digital audio signal and a second digital audio signal.

13. The invention of claim 12, wherein the delayed output and second digital audio signals are left and right ear signals.

14. The invention of claim 12, wherein the coarse delay module is adapted to generate the second digital audio signal by delaying the input digital audio signal by a coarse delay value.

15. The invention of the claim 14, wherein the coarse delay value used to generate the second digital audio signal is different from the first amount of delay used to generate the partially delayed digital audio signal.

16. The invention of the claim 1, further comprising a control module adapted to generate first and second delay control signals used by the first and second delay modules to select the first and second amounts of delay, wherein:

the first delay module comprises:

a buffer adapted to receive and store a plurality of digital values corresponding to the input digital audio signal such that each position in the buffer corresponds to a different one of the plurality of available first delay values; and a switch having a plurality of input ports and an output port, wherein:

each input port is connected to receive a different digital value stored in the buffer; and the switch is adapted to present one of the received digital values at its output port based on the first delay control signal;

the second delay module comprises:

a plurality of digital filters, configured in parallel, each digital filter adapted to apply a different one of the plurality of available second delay values; and switch circuitry adapted to select, based on the second delay control signal, one of the digital filters to provide the second amount of delay; and the total range of the plurality of available second delay values at the second resolution level is substantially equal to each increment at the first resolution level.

17. The invention of claim 16, wherein:

the buffer is a FIFO buffer adapted to receive a new digital value in the input digital audio signal at each clock cycle of the FIFO buffer;

the digital filters are all-pass filters having different phase shift values;

the switch circuitry comprises:

an input switch adapted to receive and forward the partially delayed digital audio signal to only the selected digital filter; and an output multiplexer having a plurality of input ports and an output port, wherein:

each input port is connected to a different digital filter; and the output multiplexer is adapted to present the output from the selected digital filter at its output port;

the control module comprises a LUT storing data that maps 3D positions to interaural delays; and the control module is adapted to:

receive a specified 3D position value;

retrieve a corresponding interaural delay value from the LUT based on the specified 3D position value; and generate the first and second delay control signals on the retrieved interaural delay value.

18. The invention of claim 16, wherein:

the first delay module is a coarse delay module having a coarse resolution level;

the second delay module is a fine delay module having a fine resolution level that is finer than the coarse resolution level;

the first and second amounts of delay are applied to the input digital audio signal to create a relative delay between the delayed output digital audio signal and a second digital audio signal;

the delayed output and second digital audio signals are left and right ear signals;

the coarse delay module is adapted to generate the second digital audio signal by delaying the input digital audio signal by a coarse delay value;

the coarse delay value used to generate the second digital audio signal is different from the first amount of delay used to generate the partially delayed digital audio signal.

19. A method for generating a delayed output digital audio signal from an input digital audio signal, the method comprising:

(a) applying a first amount of delay to the input digital audio signal to generate a partially delayed digital audio signal, wherein the first amount of delay is selected from a plurality of available first delay values separated from one another by increments at a first resolution level; and (b) applying a second amount of delay to the partially delayed digital audio signal to generate the delayed output digital audio signal, wherein the second amount of delay is selected from a plurality of available second delay values separated from one another by increments at a second resolution level different from the first resolution level.

20. The invention of claim 19, wherein the total range of the plurality of available second delay values at the second resolution level is substantially equal to each increment at the first resolution level.

21. The invention of claim 19, wherein step (a) comprises:

receiving and storing, in a buffer, a plurality of digital values corresponding to the input digital audio signal such that each position in the buffer corresponds to a different one of the plurality of available first delay values; and selecting, based on a first delay control signal, one of the stored digital values as the partially delayed digital audio signal.

22. The invention of claim 21, wherein the buffer is a FIFO buffer adapted to receive a new digital value in the input digital audio signal at each clock cycle of the FIFO buffer.

23. The invention of claim 19, wherein step (b) comprises:

selecting, based on a second delay control signal, one of a plurality of digital filters, configured in parallel, each digital filter adapted to apply a different one of the plurality of available second delay values; and delaying the partially delayed digital audio signal using the selected digital filter to provide the second amount of delay.

24. The invention of claim 23, wherein the digital filters are all-pass filters having different phase shift values.

25. The invention of claim 19, further comprising (c) generating first and second delay control signals used in steps (a) and (b) to select the first and second amounts of delay.

26. The invention of claim 25, wherein step (c) comprises:

receiving a specified 3D position value;

retrieving, based on the specified 3D position value, a corresponding interaural delay value from a LUT storing data that maps 3D positions to interaural delays; and generating the first and second control signals based on the retrieved interaural delay value.

27. The invention of claim 19, wherein the first amount of delay is larger than the second amount of delay.

28. The invention of claim 27, wherein the first and second amounts of delay are applied to the input digital audio signal to create a relative delay between the delayed output digital audio signal and a second digital audio signal.

29. The invention of claim 28, wherein the delayed output and second digital audio signals are left and right ear signals.

30. The invention of claim 28, wherein a coarse delay value is applied to the input digital audio signal to generate the second digital audio signal.

31. The invention of the claim 30, wherein the coarse delay value used to generate the second digital audio signal is different from the first amount of delay used to generate the partially delayed digital audio signal.

32. The invention of claim 19, further comprising (c) generating first and second delay control signals used in steps (a) and (b) to select the first and second amounts of delay, wherein:

step (a) comprises:

receiving and storing, in a buffer, a plurality of digital values corresponding to the input digital audio signal such that each position in the buffer corresponds to a different one of the plurality of available first delay values; and selecting, based on a first delay control signal, one of the stored digital values as the partially delayed digital audio signal;

step (b) comprises:

selecting, based on a second delay control signal, one of a plurality of digital filters, configured in parallel, each digital filter adapted to apply a different one of the plurality of available second delay values; and delaying the partially delayed digital audio signal using the selected digital filter to provide the second amount of delay; and the total range of the plurality of available second delay values at the second resolution level is substantially equal to each increment at the first resolution level.

33. The invention of claim 32, wherein:

the buffer is a FIFO buffer adapted to receive a new digital value in the input digital audio signal at each clock cycle of the FIFO buffer;

the digital filters are all-pass filters having different phase shift values; and step (c) comprises:

receiving a specified 3D position value;

retrieving, based on the specified 3D position value, a corresponding interaural delay value from a LUT storing data that maps 3D positions to interaural delays; and generating the first and second control signals based on the retrieved interaural delay value.

34. The invention of claim 32, wherein:

the first amount of delay is larger than the second amount of delay;

the first and second amounts of delay are applied to the input digital audio signal to create a relative delay between the delayed output digital audio signal and a second digital audio signal;

the delayed output and second digital audio signals are left and right ear signals;

a coarse delay value is applied to the input digital audio signal to generate the second digital audio signal;

the coarse delay value used to generate the second digital audio signal is different from the first amount of delay used to generate the partially delayed digital audio signal.

35. An apparatus for generating a delayed output digital audio signal from an input digital audio signal, the apparatus comprising:

(a) means for applying a first amount of delay to the input digital audio signal to generate a partially delayed digital audio signal, wherein the first amount of delay is selected from a plurality of available first delay values separated from one another by increments at a first resolution level; and (b) means for applying a second amount of delay to the partially delayed digital audio signal to generate the delayed output digital audio signal, wherein the second amount of delay is selected from a plurality of available second delay values separated from one another by increments at a second resolution level different from the first resolution level.

* * * * *